(12) United States Patent
Nichols et al.

(10) Patent No.: US 8,658,732 B2
(45) Date of Patent: Feb. 25, 2014

(54) CAVITATED ORIENTED POLYETHYLENE POLYMER COMPOSITES

(75) Inventors: Kevin L. Nichols, Freeland, MI (US); William J. Michie, Jr., Missouri City, TX (US); Mridula Kapur, Lake Jackson, TX (US)

(73) Assignee: Eovations, LLC, Grand Rapids, MI (US)

( * ) Notice: Subject to any disclaimer, the term of this patent is extended or adjusted under 35 U.S.C. 154(b) by 775 days.

(21) Appl. No.: 12/715,906

(22) Filed: Mar. 2, 2010

(65) Prior Publication Data

US 2010/0227144 A1    Sep. 9, 2010

Related U.S. Application Data

(60) Provisional application No. 61/158,495, filed on Mar. 9, 2009.

(51) Int. Cl.
| | |
|---|---|
| *C08L 23/08* | (2006.01) |
| *C08L 23/06* | (2006.01) |
| *C08K 3/34* | (2006.01) |
| *B29C 55/30* | (2006.01) |

(52) U.S. Cl.
USPC ........... 524/587; 524/451; 524/579; 524/585; 521/143; 521/144

(58) Field of Classification Search
USPC ........... 521/143, 144; 524/585, 587, 579, 451
See application file for complete search history.

(56) References Cited

U.S. PATENT DOCUMENTS

| | | | |
|---|---|---|---|
| 4,938,913 A | 7/1990 | Ward et al. | |
| 5,169,587 A * | 12/1992 | Courval | 264/323 |
| 5,234,652 A | 8/1993 | Woodhams et al. | |
| 5,695,698 A | 12/1997 | Ajji et al. | |
| 7,449,527 B2 | 11/2008 | Razavi | |
| 2008/0111277 A1 | 5/2008 | Nichols et al. | |
| 2008/0111278 A1 | 5/2008 | Nichols et al. | |
| 2009/0001625 A1 | 1/2009 | Newson et al. | |
| 2009/0001629 A1 | 1/2009 | Newson et al. | |
| 2009/0001635 A1 | 1/2009 | Newson et al. | |

OTHER PUBLICATIONS

Balke et al., Chapter 13: A Strategy for Interpreting Multidetector Size-Exclusion Chromatography Data II Applications in Plastic Waste Recovery., American Chemical Society, (1992), 199-219.
Bentley et al., Polarized FT Raman studies of an ultra-high modulus polyethylene rod., Spectrochimica Acta, Part A: Molecular and Biomolecular Spectroscopy., (1995), 51A(12), 2125-31.
Darras et al., Anisotropic elasticity of oriented polyethylene materials., Composites Science and Technology (1995), 55(2), 131-8.
Lee et al., Die drawing technology of high-molecular-weight polyethylene., Journal of Applied Polymer Science (1993), 49(1), 15-23.
Mannell et al., Effects of superimposing rotational components on monoaxial die—drawing of polymers in their solid state., Polymer (2001), 42(14), 6043-6055.
Mourey et al., Chapter 12: A Strategy for Interpreting Multidetector Size-Exclusion Chromatography Data I Development of a Systematic Approach., (1992), 180-198.
Tan et al., Dynamic mechanical behavior of copolymerized HDPE by die drawing process., Resin Research Inst., (2001), 17(5), 156-158.
Taraita et al., Production and Properties of Biaxially Oriented Polyethylene Tubes., Journal of Applied Polymer Science, (1996), vol. 59, 627-638.
Ulas, I., Drawing of High Density Polyethylene Tube: Effect of Different Cooling Conditions., Poly. Eng. and Science, (1999) vol. 39, No. 5, 855-861.
Williams et al., The Construction of a Polyethylene Calibration Curve for Gel Permeation Chromatography Using Polystyrene Fractions., Polymer Letters, (1968) vol. 6, 621-624.
Yau et al., New approaches using MW—sensitive detectors in GPC—TREF for polyolefin characterization., Polymer 42 (2001) 8947-8958.
Zimm, Bruno H., Apparatus and Methods for Measurement and Interpretation of the Angular Variation of Light Scattering, Preliminary Results on Polystyrene Solutions., The Journal of Chemical Physics, (1948) vol. 16, No. 12, 1099-1116.
Buschow, K. H. et al, Encyclopedia of Materials—Science and Technology, 2001, ISBN: 9780080431529, vol. 1-11, p. 7172-7181.

* cited by examiner

*Primary Examiner* — Fred M Teskin
(74) *Attorney, Agent, or Firm* — McGarry Bair PC

(57) ABSTRACT

Solid state draw a polymer billet, wherein at least 50 percent of all polymers in the billet is a continuous phase of polyethylene polymer having a density of 0.941-0.959 grams per cubic centimeter and a weight-average molecular weight that is 110,000 grams per mole or greater, at a drawing rate of 1.2 meters per minute or faster using a tensile force to create an oriented and cavitated polymer composition whose cross section dimensions all exceed two millimeters.

10 Claims, No Drawings

CAVITATED ORIENTED POLYETHYLENE POLYMER COMPOSITES

CROSS REFERENCE STATEMENT

This application claims the benefit of U.S. Provisional Application No. 61/158,495 filed Mar. 9, 2009, which is incorporated herein by reference.

BACKGROUND OF THE INVENTION

1. Field of the Invention

The present invention relates to oriented polyethylene polymer composites and a solid state drawing process for preparing oriented polyethylene polymer composites.

2. Description of Related Art

Oriented polymer composites (OPCs) are of increasing interest as high strength construction materials. For example, OPCs have entered the market place in the form of decking and fencing materials. Polymer materials offer an advantage over traditional materials such as wood due to the longevity and low maintenance of the polymer materials. Orientation of polymer compositions introduces strength in the polymer materials that rivals that of wood. Moreover, recent developments in obtaining cavitation void volume in large dimension OPCs enables production of OPCs having densities equal to or less than wood while still approaching the strength of wood. The use of solid state drawing dies has revolutionized the ability to draw large dimension OPCs having reproducible and precise shapes and is facilitating the expansion of OPCs into market avenues such as trim and other building materials that have intricate profiles.

Solid state drawing, particularly solid state die drawing can result in cavitation during drawing. Cavitation decreases the density of a drawn polymer by introducing voids in the drawn polymer. Polymer compositions containing filler have a greater tendency to cavitate than polymer composition without filler. The extent of cavitation is dependent upon the number of filler particles and to some extent the drawing rate, with an increase in either resulting in an increase in cavitation. One study has found that the extent of cavitation as a function of drawing rate reaches a plateau, or levels off, at a drawing rate of 1.2 meters (4 feet) per minute or faster (see, United States published patent application 2008-0111278). Drawing sufficiently fast so as to achieve a constant level of cavitation is desirable to ensure product density uniformity even with slight drawing rate variations.

Polypropylene has been the most popular polymer for use in producing OPCs. However, polyethylene is another low cost commodity plastic that could be used to manufacture OPCs. Polyethylene offers better inherent weatherability and toughness than polypropylene and so offers advantages as an OPC over polypropylene. Polyethylene OPCs would be cost effective, particularly if the polyethylene OPC was cavitated to reduce its weight. It is desirable to be able to include filler into the polyethylene prior to drawing to help facilitate cavitation during solid state die drawing. Moreover, it is desirable to be able to draw the polyethylene in a solid state die drawing process to benefit from the control a solid state drawing die offers in OPC production.

U.S. Pat. No. 4,938,913 ('913) discloses a ram extrusion process for orienting polyethylene. Teaching in '913 suggests that orientation can occur by a die drawing process. However, there is no teaching of how to orient the polyethylene in a solid state drawing process.

U.S. Pat. No. 5,234,652 ('652) discloses a process for continuously producing oriented very high and ultra high molecular weight polyethylene through a die drawing process. However, '652 illustrates drawing polymers at a temperature at or above their softening temperature rather than solid state drawing.

A journal article describes solid state die drawing of high molecular weight polyethylene (see, Lee and Li, DIE DRAWING TECHNOLOGY OF HIGH MOLECULAR WEIGHT POLYETHYLENE, Journal of Applied Polymer Science, Vol. 49, 15-23 (1993)). FIG. 3 of that article illustrates drawing rates up to 110 millimeters per minute.

Another journal article discloses solid state die drawing polyethylene tubes at a drawing rate of less than 80 centimeters per minute (see, Taraiya and Ward, PRODUCTION AND PROPERTIES OF BIAXIALLY ORIENTED POLYETHYLENE TUBES, Journal of Applied Polymer Science, Vol. 59, 627-638 (1996)).

It is desirable to develop a process for preparing OPCs of filled polyethylene by solid state drawing processes, especially a solid state die drawing process, in order to obtain cavitated OPCs of polyethylene. Moreover, it is desirable to prepare such OPCs at a drawing rate greater than 1.2 meters (four feet) per minute in order to benefit from stable extent of cavitation. Even faster drawing rates are desirable to increase production rates.

BRIEF SUMMARY OF THE INVENTION

Development of the present invention discovered problems with preparing OPCs from polyethylene polymers and resulted in providing solutions to one or more of the problems to preparing OPCs from polyethylene, particularly when drawing at a rate of 1.2 meters per minute or faster.

Surprisingly, experimentation with polyethylene polymers in solid state die drawing processes revealed a dramatic difference in solid drawing performance in polyethylene polymers. Comparative Examples in the present document (see below) reveal that polyethylene polymers having a weight-average molecular weight (Mw) below about 110,000 grams per mole break or fracture when attempting to draw them at a drawing rate of greater than 1.2 meters per minute. Yet, polyethylene having a Mw exceeding 110,000 grams per mole demonstrates a dramatic increase in maximum drawing rate and a drawing rate of 1.2 meters per minute and faster is achievable. Still more surprising, the experimentation revealed that when the specific polyethylene includes filler the resulting OPC can be cavitated.

In a second aspect the present invention is a cavitated oriented polymer composition article formed from a polymer billet comprising a filler and a continuous phase of polyethylene polymer wherein the polyethylene polymer accounts for more than 50% of all polymers in the polymer billet, has a bimodal molecular weight distribution, a density of 0.941-0.959 grams per cubic centimeter and a weight-average molecular weight that is 110,000 grams per mole or greater and wherein all cross section dimensions of the cavitated oriented polymer composition exceed two millimeters.

Specific embodiments of the second aspect include any one or any combination of more than one of the following characteristics: ten percent or more of the polyethylene polymer chains have a molecular weight of 316,000 grams per mole or higher; the weight-average molecular weight of the polyethylene polymer is 170,000 grams per mole or higher; the polyethylene polymer is selected from a group consisting of polyethylene homopolymer and polyethylene copolymers containing polymerized ethylene units and one or more than one unsaturated hydrocarbon having from four to eight carbons copolymerized with the ethylene units; the oriented polymer composition comprises more than 20 weight-percent filler based on cavitated oriented polymer composition weight.

In another aspect, the present invention is a cavitated oriented polymer composition article formed from a polymer billet comprising a filler and a continuous phase of polyethylene polymer wherein the polyethylene polymer accounts for more than 50% of all polymers in the polymer billet, has at least a unimodal molecular weight distribution, a density of 0.941-0.959 grams per cubic centimeter and a weight-average molecular weight that is 110,000 grams per mole or greater, and wherein all cross section dimensions of the cavitated oriented polymer composition article exceed two millimeters and wherein the extent of cavitation of the cavitated oriented polymer composition article is greater than 30%.

The process of the present invention is useful for preparing the OPC of the present invention. The OPC of the present invention is useful as a building and construction material including decking, siding, trim, fencing materials including posts and rails, as well as extremely large scale products such as railroad ties and telephone poles.

DETAILED DESCRIPTION OF THE INVENTION

General Terms

"Polymer composition" comprises a continuous polymer phase containing at least one polymer component and can contain non-polymeric components. A "filled" polymer composition includes discontinuous additives, such as organic filler, inorganic filler and/or crosslinked rubber particles, in the polymer composition.

"Oriented polymer composition", or "OPC", is an article of manufacture prepared from a polymer composition comprising an orientable polymer by orienting at least the orientable polymer component in the polymer composition. To be clear, an "oriented polymer composition" is more than a "polymer composition" but rather a polymer composition that has been acted upon thereby rendering it an article of manufacture. Oriented polymer composition article, OPC article, OPC and oriented polymer composition are all interchangeable terms.

An "orientable polymer" is a polymer that can undergo induced molecular orientation by solid state deformation (for example, solid state drawing). An orientable polymer can be amorphous or semi-crystalline (semi-crystalline polymers have a melt temperature ($T_m$) and include those polymers known as "crystalline").

"Weight-percent" and "wt %" are interchangeable and are relative to total polymer weight unless otherwise stated.

"Solid state" refers to a polymer (or polymer composition) that is at a temperature below the softening temperature of the polymer (or polymer composition). Hence, "solid state drawing" refers to drawing a polymer or polymer composition that is at a temperature below the softening temperature of the polymer (or polymer composition).

"Cross sections" of an OPC are perpendicular to the orientation direction of the OPC unless the reference to the cross section indicates otherwise. A cross section has a centroid, a perimeter and dimensions. "Cross section dimensions" are dimensions of a cross section that extend through the centroid and connect two points on the perimeter of the cross section.

"Thickness" of an OPC is the smallest cross section dimension of the OPC. Thickness of a cross section is the smallest cross section dimension of the cross section.

"Softening temperature" ($T_s$) for a polymer or polymer composition having as polymer components only one or more than one semi-crystalline polymer is the melting temperature for the polymer composition.

"Melting temperature" ($T_m$) for a semi-crystalline polymer is the temperature half-way through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ for a combination of polymers and for a filled polymer composition also by DSC under the same test conditions in ASTM method E794-06. Determine $T_m$ using a heating rate of 10 degrees Celsius (° C.) per minute. If the combination of polymers or filled polymer composition only contains miscible polymers and only one crystalline-to-melt phase change is evident in its DSC curve, then $T_m$ for the polymer combination or filled polymer composition is the temperature half-way through the phase change. If multiple crystalline-to-melt phase changes are evident in a DSC curve due to the presence of immiscible polymers, then $T_m$ for the polymer combination or filled polymer composition is the $T_m$ of the continuous phase polymer. If more than one polymer is continuous and they are not miscible, then the $T_m$ for the polymer combination or filled polymer composition is the lowest $T_m$ of the continuous phase polymers.

The softening temperature for a polymer or polymer composition having as polymer components only one or more than one amorphous polymer is the glass transition temperature for the polymer composition.

"Glass transition temperature" ($T_g$) for a polymer or polymer composition is as determined by DSC according to the procedure in ASTM method E1356-03. Determine $T_g$ for a combination of polymer and for a filled polymer composition also by DSC under the same test conditions in ASTM method E1356-03. If the combination of polymer or filled polymer composition only contains miscible polymers and only one glass transition phase change is evident in the DSC curve, then $T_g$ of the polymer combination or filled polymer composition is the temperature half-way through the phase change. If multiple glass transition phase changes are evident in a DSC curve due to the presence of immiscible amorphous polymers, then $T_g$ for the polymer combination or filled polymer composition is the $T_g$ of the continuous phase polymer. If more than one amorphous polymer is continuous and they are not miscible, then the $T_g$ for the polymer composition or filled polymer composition is the lowest $T_g$ of the continuous phase polymers.

If the polymer composition contains a combination of semi-crystalline and amorphous polymers, the softening temperature of the polymer composition is the softening temperature of the continuous phase polymer or polymer composition. If the semi-crystalline and amorphous polymer phases are co-continuous, then the softening temperature of the combination is the lower softening temperature of the two phases.

"Drawing temperature" is a temperature within a drawing temperature range at which a polymer is conditioned prior to drawing and is the temperature at which the polymer exists upon the initiation of drawing.

An artisan understands that a polymer composition typically has a variation in temperature through its cross section (that is, along a cross section dimension of the composition) during processing. Therefore, reference to temperature of a polymer composition refers to an average of the highest and lowest temperature along a cross section dimension of the polymer composition. The temperature at two different points along the polymer cross section dimension desirably differs by 10% or less, preferably 5% or less, more preferably 1% or less, most preferably by 0% from the average temperature of the highest and lowest temperature along the cross section dimension. Measure the temperature in degrees Celsius (° C.)

along a cross section dimension by inserting thermocouples to different points in the cross section dimension.

"Substantially proportional" can include reasonable deviations from perfectly proportional. For example, "substantially proportional" takes into account reasonable machining capabilities in regards to the die shaping channel shape and reasonable control over extruded polymer composition shapes. In its broadest application, "substantially proportional" cross sections can have deviations of 5% or less, preferably 3% or less, more preferably 1% or less from proportional. Determine percent deviation from proportional by dividing the ratio of two cross section dimensions for a smaller cross section by a ratio of the same cross section dimensions for another larger cross section, subtracting that value from one and multiplying by 100%. For example, measure dimensions AB and CD for a first cross section and corresponding dimensions A'B' and C'D' for a second larger cross section. The percent deviation from proportional for these two cross sections is the absolute value of 100[1−(AB)(C'D')/(A'B')(CD)]. Substantially proportional can mean perfectly proportional (that is, a 0% deviation from proportional) in any use of the term herein.

"ASTM" refers to an American Society for Testing and Materials test method. The year of the method is either designated by a hyphenated suffix in the method number or, in the absence of such a designation, is the most current year prior to the priority date of this application.

"Multiple" means at least two. "And/or" means "and, or as an alternative." Ranges include endpoints unless otherwise stated.

Process and Composition

The process of the present invention includes providing a polymer billet that comprises filler and a continuous phase of polyethylene polymer. The polymer billet is a polymer composition that has a softening temperature. More than 50 weight-percent (wt %), preferably 70 wt % or more, more preferably 80 wt % or more and still more preferably 90 wt % or more of the polymers in the polymer billet are polyethylene polymers relative to total weight of polymers in the polymer billet. All of the polymers in the polymer billet (that is, the polymer composition) can be but do not necessarily have to be polyethylene polymer. The polyethylene polymer is an orientable polymer that undergoes orientation during the solid state drawing process of the present invention.

Polyethylene polymer is difficult to draw in its solid state, especially through a solid state drawing die, to form a cavitated oriented polymer composition (OPC) at desirable drawing rates. Therefore, the present process offers a surprising discovery by identifying polyethylene polymer that can undergo solid state drawing, even solid state die drawing. In particular, only certain polyethylene polymer was found to be suitable for use in the present invention to allow drawing at a drawing rate of 1.2 meters per minute or faster at a solid state drawing die to produce a cavitated OPC.

The polyethylene polymer for use in the present invention necessarily has a density in a range of 0.941 to 0.959 grams per cubic centimeter (g/cm$^3$) and has a weight-average molecular weight (Mw) that is 110,000 grams per mole (g/mol) or higher. Polyethylene polymer having a Mw below 110,000 g/mol breaks during a drawing process, even at extremely slow drawing rates, and is unable to produce an OPC according to the process of the present invention. Determine density according to ASTM D-792-00. Determine Mw according to the gel permeation chromatography (GPC) method set forth in the Example section, below.

The maximum draw rate before which a polyethylene polymer composition breaks during solid state die drawing was found to increase with polyethylene polymer Mw. Therefore, polyethylene polymer having an Mw greater than 110,000 g/mol are desirable. Yet more desirable are polyethylene polymers having a Mw of 156,000 g/mol or higher. Polyethylene polymers having a Mw of 156,000 g/mol can tolerate solid state drawing rates of at least 4.9 m/min. Even more desirable are polyethylene polymers having a Mw of 170,000 g/mol or more, still more desirable 190,000 g/mol or more because these higher Mw polyethylene polymers can be tolerate a solid state drawing rate of at least 5.7 m/min.

Desirable polyethylene polymer for use in the present invention further includes 10% or more, preferably 15% or more and still more preferably 20% or more of polymer chains with molecular weight exceeding 316,000 g/mol. Without being bound by theory, these higher molecular weight polymer chains may contribute to a higher degree of entanglement, therefore higher tensile strengths, than lower molecular weight polymer components.

The polyethylene polymer can be a polyethylene homopolymer, a polyethylene copolymer (including combination of more than one copolymer) or a combination of polyethylene homopolymer and polyethylene copolymer, two or more polyethylene homopolymers or two or more different copolymers. Desirable polyethylene copolymers for each of these possible polyethylene compositions are one or more than one type of unsaturated hydrocarbon that has four to ten carbons and that is copolymerized with ethylene.

The polyethylene polymer can be a one polymer or a blend of more than one polymer, each with different characteristics. Particularly suitable for use in the present invention is a polyethylene polymer with a bimodal molecular weight distribution (a "bimodal polyethylene"). A bimodal polyethylene can comprise two polyethylene polymers having different Mw values blended together. Alternatively, a bimodal polyethylene can comprise two polyethylenes having distinctly different Mw values that are made together in sequential reactors or even in a single reactor. U.S. Pat. No. 7,449,527B2 (incorporated herein by reference in its entirety) describes examples of each method: preparing bimodal polyethylene by melt blending two different polyethylenes, preparing directly in sequential reactors and by directly preparing a bimodal polyethylene in a single reactor.

Polyethylene polymers that are ultra-violet (UV) stabilized, impact modified polyethylene polymers, or UV stabilized impact modified polyethylene polymers are also suitable for use in the present invention. Particularly desirable are polyethylene polymers comprising organic UV stabilizers. The polyethylene can be free of titanium dioxide to achieve UV stabilization in order to minimize the amount of pigment necessary to achieve any of a full spectrum of colors in the polyethylene. Desirable UV stabilizers for use in the polyethylene are hindered amine-type light stabilizers (HALS).

The polymer billet, as well as OPC of the present invention, can contain filler. The filler, if present, exists dispersed within, preferably throughout the entire orientable polymer billet and OPC. Filler can serve many purposes including serving to enhance flame retardancy, facilitate cavitation during the drawing process, and provide partial reinforcement of an article. Filler can be beneficial in nearly any concentration but generally is present at a concentration of 20 wt % or more, preferably 30 wt % or more and can be present at concentrations of 40 wt % or more 50 wt % or more and even 60 wt % or more based on total polymer billet and OPC weight. It is common for the filler concentration to be 90 wt % or less based on total polymer billet and OPC weight because if too much filler is present the polymer billet and OPC can lose structural integrity.

The filler can be organic, inorganic or a combination of organic and inorganic filler. Suitable organic filler include cellulosic materials such as wood flour, wood pulp, flax, rice hulls, any natural fiber, as well as crosslinked and/or thermoset rubber particles. Suitable inorganic filler include mica, talc (including any or a combination of materials and grades commonly known and available as "talc"), chalk, magnesium hydroxides, aluminum hydroxides, dolomite, titanium dioxide, clay (for example, kaolin), alumina, silica, glass beads, calcium carbonate, magnesium sulfate, barium sulfate, calcium oxysulfate, tin oxide, metal powder, glass powder, pigments, minerals, glass, ceramic, polymeric or carbon reinforcing agents, glass fibers, carbon fibers, wollastonite, graphite, magnesium carbonate, alumina, metal fibers, silicon carbide, and glass flake. Inorganic fillers that can react with water (such as Portland cement and gypsum) are also suitable inorganic fillers for use in the present invention.

Inorganic filler is more desirable than cellulosic filler for numerous reasons including that inorganic filler tends to be more thermally stable and resistant to decay and discoloration. It is desirable for inorganic filler to account for 50 volume percent (vol %) or more, preferably 75 vol % or more, and most preferably 100 vol % of the total volume of filler.

The polymer billet, and hence, the resulting OPC, can further contain additives that enhance flame retardancy, foaming agents, or any other additives common to plastic processing.

The present invention includes drawing the polymer billet at a drawing temperature that is below the softening temperature of the polymer composition. The process can be a continuous process where a polymer billet is continuously extruded at a temperature equal to or above its softening temperature and then is conditioned to a drawing temperature and drawn, preferably through a drawing die, while maintaining continuity with polymer composition exiting the extruder. The drawing process can also be a discontinuous process wherein a polymer billet is extruded, cut to a length, and stored for any period of time prior to drawing.

The present process does not require an entire billet be at the drawing temperature, only that portion of the polymer billet that is undergoing drawing, such as that portion entering a solid state drawing die when using a solid state drawing die process. For example, in the continuous process, where the billet proceeds as a continuous billet from an extruder and into a solid state drawing die, the billet is likely at a temperature above the drawing temperature proximate to the extruder and yet is at the drawing temperature when it enters the solid state drawing die. An entire billet can be at the drawing temperature prior to drawing, which is most practical in discontinuous processes, but it is not necessary that the entire billet be at the drawing temperature when drawing.

The drawing temperature is desirably three degrees Celsius (° C.) or more below the polymer billet's softening temperature. The drawing temperature can be 10° C. or more, 20° C. or more, 30° C. or more, even 40° C. or more below the polymer billet's softening temperature. Lower drawing temperatures are desirable to achieve maximum cavitation in the polymer billet during drawing. Cavitation is desirable to lower the density of the polymer composition to create a relatively low density OPC. Generally, the drawing temperature is 40° C. or less below the polymer billet's softening temperature. Drawing a polymer billet at a drawing temperature more than 40° C. below the softening temperature requires slower draw rates than is economically desirable in order to avoid fracturing.

Desirably, the process of the present invention solid state draws a polymer composition through a solid state drawing die. Solid state drawing dies are converging dies, which means the shaping channel through the die reduces in cross sectional area between the entrance and exit of the die channel. The present process, in its broadest sense, does not depend on the type of solid state drawing die. However, proportional drawing dies such as those described in United States published patent application 2008/0111277A1 are desirable to provide maximum control and predictability to the shape of the resulting OPC.

Draw the billet, preferably through a solid state drawing die, using a tensile force. Drawing using a tensile force is different from extrusion through a die using a compressive force. Tensile forces pull from the direction the billet is traveling whereas compressive forces are applied from behind the polymer billet and push the billet through a die. Tensile drawing is desirable because, unlike compressive extrusion, tensile drawing can induce cavitation in the polymer billet during drawing and thereby reduce the density of the resulting OPC. Tensile drawing also can achieve much faster drawing rates than orienting using compressive forces. The present process can include a combination of both tensile and compressive forces as long as the tensile force accounts for more than 50%, preferably 60% or more, more preferably 70% or more, still more preferably 80% or more and yet more preferably 90% or more of the total force applied to the polymer composition during solid state drawing. 100% of the force can be a tensile force.

Draw the polymer billet at a drawing rate of 1.2 meters per minute or faster. Generally, the faster the drawing rate the more a polymer composition necks, cavitates or converges during a drawing process. Drawing at a rate of at least 1.2 meters per minute ensures a constant extent of cavitation despite fluctuations in drawing rate. Prior studies have shown that solid state drawing a filled orientable polymer composition at a drawing rate of 1.2 meters per minute or faster results in a relatively constant extent of cavitation despite variations in drawing rate. Solid state drawing at a rate slower than 1.2 meters per minute can result in an extent of cavitation that is sensitive to drawing rate (see, United States published patent application 2008-0111278).

It is general practice to define as the drawing rate for an entire solid state drawing process the fastest linear rate the polymer composition experiences during the entire drawing process, which is typically the rate at which the final OPC is manufactured. One of ordinary skill in the art understands that a polymer composition may experience multiple local or intermediate drawing rates during an entire drawing process. For example, a polymer composition may have one drawing rate after a solid state drawing die and yet increase drawing rate by free-drawing after the drawing die. Similarly, the drawing rate of a polymer composition increases as it necks during free-drawing and during die-drawing. These processes can be construed as having variable drawing rates. Moreover, drawing can occur in multiple steps; thereby, experiencing multiple intermediate drawing rates. For example, using two different drawing dies in sequence will produce at least two different intermediate drawing rates, with the drawing rate after the second drawing die being faster than the drawing rate after the first die. All conceivable combinations and variations of drawing are within the scope of the present invention. One of ordinary skill in the art recognizes that an overall drawing process may include multiple intermediate drawing steps, each of which may have an intermediate drawing rate that corresponds to the fastest linear rate the orientable polymer composition travels during that intermediate drawing step. Intermediate drawing rates are equal to or less than the drawing rate for the entire process. Reference to drawing rate in the present teaching follows the convention of general practice and refers to the final and fastest drawing rate in a drawing process unless otherwise indicated.

Increasing drawing rates increase production rates. Therefore, faster rates are desirable. However, polyethylene is a particularly challenging polymer composition to draw without breaking, especially at fast drawing rates. The present invention surprisingly can achieve drawing rates of 2 meters per minute or faster, 4 meters per minute or faster, even 5.5 meters per minute or faster. The fastest draw rate tested on the present process was 5.7 meters per minute so an upper limit on draw rate is unknown. It is likely the drawing rate will be 20 meters per minute or slower.

The polymer billet cavitates during the drawing process, which introduces void volume into the polymer billet. Cavitation is desirable because it is a method for introducing void volume without having to foam the polymer billet. In fact, the polymer billet can be free of void volume. The polymer billet can also be free of blowing agent. The extent of cavitation occurring during the process of the present invention is desirably 10% or more, preferably 20% or more and still more preferably 30% or more. Typically cavitation void volume is 60% or less, and can be 50% or less and even 45% or less. Determine percent void volume from the density of the polymer composition prior to drawing and the density of the OPC after drawing using the formula of equation 1:

$$\% \text{ Cavitation Void Volume} = (1 - ((\rho_{opc})/(\rho_{polymer\ composition})) \times 100\% \quad (1)$$

Where $\rho_{ops}$ is the density of the OPC after drawing and $\rho_{polymer\ composition}$ is the density of the polymer composition prior to drawing.

The present process produces OPC articles having cross section dimensions that all exceed two millimeters. That means that when drawing through a solid state drawing die the drawing die exit cross section dimensions all exceed two millimeters and any free drawing occurring after the drawing die is limited to ensure the final OPC article has cross section dimensions that all exceed two millimeters. Desirably, all cross section dimensions of the OPC articles are five millimeters or more, preferably 7.5 millimeters or more. The process is distinct from oriented film processes, which require drawing polymer compositions having much smaller cross section dimensions and which, as a result, have many fewer challenges.

Drawing a polymer composition with a relatively large cross sectional area has challenges that film drawing processes do not have due to processing window differences. For instance, film drawing can occur at much lower drawing temperatures than large cross section compositions and temperature equilibration of the polymer composition cross section occurs more readily for films than for large cross section compositions. Draw stresses necessary for drawing films are much lower than for large cross section articles. As a result, a drawing process is more likely to exceed the break stress when drawing larger cross section articles than when drawing films. Additionally, achieving sufficient draw stress to induce cavitation throughout a polymer composition cross section is more challenging as the cross section dimensions of the polymer composition increase. Nonetheless, the present invention overcomes each of these challenges to solid state die draw a polymer composition, even a polyethylene polymer composition, to form an OPC that exceeds two millimeters in each cross section dimension.

The OPC resulting from the present process is an OPC of the present invention. The OPC has a continuous phase of polyethylene polymer. All of the polymer composition embodiments (including limitations and preferences) for the polymer billet also apply to the polyethylene polymer of the OPC of the present invention Likewise, present teachings on fillers in regards to the polymer composition also apply to the OPC.

The OPC is cavitated and has cross section dimensions that all exceed two millimeters. Such polyethylene OPC is surprising since drawing a polyethylene having sufficient cross section dimensions and at a sufficient rate and with sufficient filler to achieve cavitation and produce a cavitated OPC having cross section dimensions that all exceed two millimeters is difficult, as already discussed. Surprisingly, the present invention employs a discovery of particular polyethylene polymers that allow preparation of such an OPC.

The OPC of the present invention has a void volume in the form of cells dispersed within the OPC. Void volume can be a result of cavitation during drawing or both use of a foamed polymer billet and cavitation. Desirably, the void volume is primarily (more than 50%) and preferably entirely the result of cavitation. Void volume due to cavitation is characterized by being proximate to a filler particle and being free of blowing agent or blowing agent by-products. The extent of cavitation in the OPC is the same as the extent of cavitation described for the process of the present invention, including all embodiments regarding extent of cavitation.

EXAMPLES

The following examples serve to illustrate embodiments of the present invention.

Characterization of the polyethylene polymers includes density and Mw values. Determine density values according to ASTM method D-792-00. Determine Mw of the polyethylene polymer according to the following GPC Method.

GPC Method for Determining Mw

Characterize polyethylene polymer Mw by high temperature triple detector gel permeation chromatography (3D-GPC). The chromatographic system comprises a Waters (Milford, Mass.) 150° C. high temperature chromatograph equipped with a Precision Detectors (Amherst, Mass.) 2-angle laser light scattering detector (Model 2040) and a 4-capillary differential viscometer detector (Model 150R from Viscotek in Houston, Tex.). A 15° angle light scattering detector angle was used for calculation purposes. Measure concentration using an infra-red detector (IR4) from PolymerChar, Valencia, Spain.

Collect data using Viscotek TriSEC software (version 3) and a 4-channel Viscotek Data Manager DM400. Use 1,2,4-trichlorobenzene (TCB) as a carrier solvent. The equipment includes an on-line solvent degas device from Polymer Laboratories. Use a carousel compartment that is at 150° C. and a column compartment at 150° C. The columns are four Polymer Laboratories Mixed-A 30 centimeter, 20 micron particle size columns. Prepare polyethylene samples that contain 0.1 grams of polymer in 50 milliliters of TCB. The chromatographic solvent, TCB, contains 200 weight parts per million (ppm) of butylated hydroxytoluene (BHT) based on TCB weight. Solvents are nitrogen sparged. Stir the polyethylene samples gently at 155° C. for four hours. Inject a sample volume of 200 microliters and a flow rate of 1.0 milliliters per minute.

Calibrate the GPC column set using 21 narrow molecular weight distribution polystyrene standards. The standards have Mws ranging from 580 to 8,400,000 g/mol. Use six "cocktail" mixtures of the standards, each having at least a decade of separation between individual Mws.

Convert the polystyrene standard peak Mws to polyethylene Mws using the following equation (see Williams and Ward, J. Polym. Sci, Polym. Let., 6, 621 (1968) for further explanation):

$$Mw_{(polyethylene)} = q \times (Mw_{(polystyrene)})^B \quad (2)$$

where: $Mw_{(polyethylene)}$ is the Mw of polyethylene; $Mw_{(polystyrene)}$ is the Mw of polystyrene; B is equal to 1.0 and the q-value is experimentally determined to be 0.39.

The best estimate of "q" was determined using a predetermined weight average molecular weight of a broad linear polyethylene homopolymer (Mw~115,000 g/mol, Mw/Mn~3.0). Said weight average molecular weight was obtained in a manner consistent with that published by Zimm (see, Zimm, G. H., J. Chem. Phys., 16, 1099 (1948)). The response factor, $K_{LS}$, of the laser detector was determined using the certificated value for the weight average molecular weight of NIST 1475 (52,000 g/mol).

A first order polynomial was used to fit the respective polyethylene-equivalent calibration points obtained from equation 2, above, to their observed elution volumes. The actual polynomial fit was obtained so as to relate the logarithm of polyethylene equivalent molecular weights to the observed elution volumes (and associated powers) for each polystyrene standard.

The total plate count of the GPC column set was performed with Eicosane (prepared at 0.04 g in 50 milliliters of TCB, and dissolved for 20 minutes with gentle agitation.) The plate count and symmetry were measured on a 200 microliter injection according to equations 3 and 4:

$$\text{PlateCount} = 5.54 * (\text{RV at Peak Maximum}/(\text{Peak width at } \frac{1}{2} \text{ height}))^2 \quad (3)$$

where RV is the retention volume in milliliters, and the peak width is in milliliters.

$$\text{Symmetry} = (\text{Rear peak width at one tenth height} - \text{RV at Peak maximum})/(\text{RV at Peak Maximum} - \text{Front peak width at one tenth height}) \quad (4)$$

where RV is the retention volume in milliliters, and the peak width is in milliliters.

The plate count for the chromatographic system (based on eicosane as discussed previously) should be greater than 22,000, and symmetry should be between 1.00 and 1.12.

A Systematic Approach for the determination of each detector offset was implemented in a manner consistent with that published by Balke, Mourey, et al. (see, Mourey and Balke, Chromatography Polym. Chpt 12, (1992) and Balke, Thitiratsakul, Lew, Cheung, Mourey, Chromatography Polym. Chpt 13, (1992)), using data obtained from the three detectors while analyzing the broad linear polyethylene homopolymer (115,000 g/mol) and the narrow polystyrene standards. The Systematic Approach was used to optimize each detector offset to give molecular weight results as close as possible to those observed using the conventional GPC method. The overall injected concentration, used for the determinations of the molecular weight and intrinsic viscosity, was obtained from the sample infra-red area, and the infra-red detector calibration (or mass constant) from the linear polyethylene homopolymer of 115,000 g/mol. The chromatographic concentrations were assumed low enough to eliminate addressing 2nd Virial coefficient effects (concentration effects on molecular weight).

The calculations of Mn, Mw, and Mz based on GPC results using the IR4 detector and the narrow standards calibration were determined from the following equations:

$$\overline{Mn} = \frac{\sum_i IR_i}{\sum_i (IR_i / M_{PE,i})}, \quad (5)$$

$$\overline{Mw} = \frac{\sum_i (IR_i * M_{PE,i})}{\sum_i IR_i} \quad (6)$$

$$\overline{Mz} = \frac{\sum_i (IR_i * M_{PE,i}^2)}{\sum_i (IR_i * M_{PE,i})} \quad (7)$$

$$\overline{Mz+1} = \frac{\sum_i (IR_i * M_{PE,i}^3)}{\sum_i (IR_i * M_{PE,i}^2)} \quad (8)$$

where $IR_i$ and $M_{PE,i}$ are the IR baseline corrected response and conventional calibrated polyethylene molecular weight for the $i^{th}$ slice of the IR response, elution volume paired data set. The equations 5, 6, 7, and 8 are calculated from polymers prepared in solutions of decalin.

The "q-factor" described previously was obtained by adjusting "q" until Mw, the weight average molecular weight calculated using equation 6 and the corresponding retention volume polynomial, agreed with the independently determined value of Mw obtained in accordance with Zimm for the broad linear polyethylene homopolymer (115,000 g/mol).

The absolute molecular weight was calculated use the 15° laser light scattering signal and the IR concentration detector, $M_{PE,I, \, abs} = K_{LS}*(LS_i)/(IR_i)$, using the same $K_{LS}$ calibration constant as in equation 9. The paired data set of the $i^{th}$ slice of the IR response and LS response was adjusted using the determined off-set as discussed in the Systematic Approach.

In addition to the above calculations, a set of alternative Mw, Mn, Mz, and $M_{Z+1}$ [Mw (abs), Mn (abs), Mz (abs), Mz (BB) and $M_{Z+1}$ (BB)] values were also calculated with the method proposed by Yau and Gillespie (see, Yau and Gillespie, Polymer, 42, 8947-8958 (2001)) and determined from the following equations.

$$\overline{Mw}(\text{abs}) = K_{LS} * \frac{\sum_i (LS_i)}{\sum_i (IR_i)} \quad (9)$$

$$\overline{Mn}(\text{abs}) = K_{LS} * \frac{\sum_i (IR_i)}{\sum_i (IR_i / LS_i)} \quad (10)$$

$$\overline{Mz}(\text{abs}) = \frac{\sum_i IR_i * (LS_i / IR_i)^2}{\sum_i IR_i * (LS_i / IR_i)} \quad (11)$$

$$\overline{Mz}(BB) = \frac{\sum_i (LS_i * M_{PE,i})}{\sum_i (LS_i)} \quad (12)$$

$$\overline{M_{Z+1}}(BB) = \frac{\sum_i (LS_i * M_{PE,i}^2)}{\sum_i (LS_i * M_{PE,i})} \quad (13)$$

where $LS_i$ is the 15 degree LS signal, and the $M_{PE,i}$ uses equation 2, and the LS detector alignment is as described previously. $K_{LS}$=LS–MW calibration constant. As explained before, the response factor, $K_{LS}$, of the laser detector was determined using the certificated value for the weight average molecular weight of NIST 1475 (52,000 g/mol).

In order to monitor the deviations over time, which may contain an elution component (caused by chromatographic changes) and a flow rate component (caused by pump changes), a late eluting narrow peak is generally used as a "flow rate marker peak". A flow rate marker was therefore established based on a decane flow marker dissolved in the eluting sample prepared in TCB. This flow rate marker was used to linearly correct the flow rate for all samples by alignment of the decane peaks.

Determine the number fraction of polymer chains having a molecular weight less than 316,000 g/mol by summing the baseline corrected infrared responses (IR,i) for the elution volume slices whose calibrated molecular weights (MPE,i) were smaller than 316,000 g/mol and expressing this as a partial sum as a fraction of the sum of all the baseline corrected infrared responses from all elution volume slices.

Preparation of Examples and Comparative Examples

Prepare the present Examples (Exs) and Comparative Examples (Comp Exs) by forming an orientable polymer composition into a polymer billet and then tensile drawing the billet into an OPC using a solid state die drawing process.

Prepare the polymer billet by first feeding polyethylene pellets into an extruder and then feeding talc downstream in the extruder to form a polymer composition. For identification of the polyethylene see Table 1, all polyethylene polymers are available from The Dow Chemical Company. The talc is a composition of 50-60 wt % talc and 40-50 wt % magnesium carbonates and has a mean diameter of 16.4 microns (for example, TC-100 from Luzenac America Inc., Englewood, Colo., USA). The polymer composition is 46 wt % (23 volume percent) talc and 54 wt % (77 volume percent) polyethylene polymer. Mix the polymer composition in the extruder at a temperature of approximately 30 degrees Celsius (° C.) above the softening temperature of the polymer composition and extrude through a rectangular billet die having exit opening dimensions of 5.08 centimeters (two inches) in width and 1.52 centimeters (0.6 inches) in height. Direct the extruded polymer composition through a calibrator having opening dimensions equivalent to the die exit opening dimension and then to a haul off device (for example, a caterpillar puller). Draw the polymer composition using the haul off device sufficiently to neck the a portion of the polymer composition (the billet "tongue") to a small enough cross section dimension to fit through a solid state drawing die for use in solid state die drawing the resulting polymer billet and of sufficient length to extend through the solid state drawing die to a drawing puller (billet puller). After creating the billet tongue, progressively slow the haul-off rate to achieve a gradually larger cross sectional area in the billet until the billet reaches full dimensions of the calibrator. Continue extruding the polymer billet to achieve a polymer billet having a length that is approximately four meters long. Repeat the process to create more polymer billets as desired. The polymer billets have negligible void volume. Therefore, any void volume in the resulting OPC will be due to cavitation during solid state drawing.

The solid state drawing die for use in the drawing process is a substantially proportional drawing die, though a substantially proportional drawing die is not necessary for the broadest scope of the process of the present invention. In a substantially proportional drawing die the shaping channel walls define a polymer composition drawing path that extends from an entrance opening to an exit opening. All cross sections of polymer composition drawn through the shaping channel and that remain in contact with the shaping channel walls have substantially proportional non-circular cross section shape and have a centroid lying on a substantially straight line ("centroid line") extending parallel to the drawing direction. All cross sections of the shaping channel are proportional to one another and the shaping channel walls continually taper towards a centroid line through the shaping channel. The shaping channel wall on the "sides" of the shaping channel (corresponding to the 1.52 centimeter dimension of the initial billet) tapers towards a centroid line of the shaping channel at a 15° angle. The shaping channel walls on the "top" and "bottom" of the shaping channel (corresponding to the 5.08 centimeter dimension of the initial billet) taper towards the centroid line of the shaping channel at a 4.6° angle. The entrance opening to the shaping channel has a rectangular cross sectional shape that is substantially proportional to but larger than the cross section dimensions of the polymer billet. The exit opening of the shaping channel is substantially proportional to the entrance opening and has rectangular dimensions of 3.49 cm by 1.046 cm.

Draw a polymer billet through the solid state drawing die to form an OPC. Feed the tongue of the billet through the drawing die, through a 23° C. water spray tank that is 1.5 meters (five feet) long and to a billet puller. Condition each billet portion prior to the solid state drawing die to a drawing temperature ($T_d$) and set the drawing die to the $T_d$. Use a $T_d$ of 110-130° C. Maintain the billet prior to drawing and the drawing die at $T_d$ throughout the drawing process. Draw the billet through the drawing die slowly at first and then gradually increase the rate (drawing rate) at which the billet puller moves the billet through the drawing die. Increase the drawing rate gradually until either the polymer billet breaks or until a drawing rate of 5.7 meters per minute is achieved. During the drawing process, the billet undergoes cavitation as it undergoes orientation. The resulting OPC is either an Example ("Ex") or Comparative Example ("Comp Ex"). The resulting OPCs have rectangular cross sections with dimensions of approximately 2.54 centimeters by 0.76 centimeters. Cut portions of the resulting OPCs into test samples to determine density. Measure density according to ASTM method D-792-00.

Table 1 provides characterizations for ten different polyethylenes and how billets of those particular polyethylenes blended with talc performed in the drawing process.

TABLE 1

| Run | Polymer | MW Modality (Unimodal or Bimodal)[a] | Density (g/cm³) | MW Fraction >316,000 g/mol (%) | Mw (kg/mol) | Ts (° C.) | Td (° C.) | Maximum Drawing Rate[b] (m/min) | Extent of Cavitation (% void volume)[d] |
|---|---|---|---|---|---|---|---|---|---|
| Comp Ex A | DMDA-8904 | U | 0.952 | 4 | 81 | 131 | 125 | 0.06 | n/a |
| Comp Ex B | DMDC-6400 | U | 0.961 | 8 | 108 | 135 | 130 | 0.12 | n/a |
| Ex 1 | DMDA-6200 | U | 0.953 | 9 | 115 | 131 | 125-130 | 2.1 | n/a |

TABLE 1-continued

| Run | Polymer | MW Modality (Unimodal or Bimodal)[a] | Density (g/cm³) | MW Fraction >316,000 g/mol (%) | Mw (kg/mol) | Ts (°C.) | Td (°C.) | Maximum Drawing Rate[b] (m/min) | Extent of Cavitation (% void volume)[d] |
|---|---|---|---|---|---|---|---|---|---|
| Ex 2 | DGDA-5200 | U | 0.950 | 13 | 156 | 131 | 115-130 | 4.9 | n/a |
| Ex 3 | TCP-2495 | U | 0.946 | 13 | 170 | 128 | 115-125 | 5.7[c] | 37 |
| Ex 4 | DMDC-6145 | U | 0.952 | 15 | 194 | 131 | 110-125 | 5.7[c] | 38 |
| Ex 5 | DMDA-6601 | B | 0.954 | 15 | 165 | 132 | 110-125 | 5.7[c] | 39 |
| Ex 6 | DGDA-2420 | B | 0.941 | 16 | 182 | 127 | 110-125 | 5.7[c] | 33 |
| Ex 7 | DGDB-NT 2480 | U | 0.944 | 17 | 222 | 128 | 110-125 | 5.7[c] | 34 |
| Ex 8 | DGDA-NT 2490 | B | 0.948 | 20 | 212 | 131 | 110-125 | 5.7[c] | 37 |

[a]Unimodal molecular weight (MW) means there is only one peak in the MW distribution. Bimodal means that the MW distribution for the polymer represents a combination of molecular weight distributions for at lest two polyethylenes having distinctively different peaks in the MW distribution curves and that are either blended together or prepared together in a single process . . .
[b]Maximum drawing rate corresponds to the fastest drawing rate the polymer billet could be drawn without breaking at the drawing temperature (Td) in the table.
[c]5.7 m/min was the fastest drawing rate tested. Runs having a maximum drawing rate listed as 5.7 m/min actually can be drawn at a faster drawing rate without breaking. That maximum draw rate is the maximum draw rate at the given drawing temperature (Td) or within the given Td range.
[d]Extent of cavitation was only measured for Examples that achieved a drawing rate of 5.7 m/min. The extent of cavitation was measured for samples drawn at 110° C.

The data in Table 1 illustrates the surprising discovery leading to the present invention. Notable in the data is a dramatic difference in maximum drawing rate of polyethylene polymers when the Mw of the polyethylene polymer increases from 108,000 g/mol to 115,000 g/mol. With negligible change in high MW fraction, the polyethylene polymer having 115,000 g/mol Mw could be drawn at a rate over an order of magnitude faster than the 108,000 g/mol Mw polyethylene polymer. The drawing rate achievable at about 110,000 g/mol is 1.2 m/min which is desirable as the drawing rate necessary to achieve a constant degree of cavitation.

The invention claimed is:

1. A cavitated oriented polymer composition article formed from a polymer billet comprising a filler and a continuous phase of polyethylene polymer wherein the polyethylene polymer accounts for more than 50% of all polymers in the polymer billet, has a bimodal molecular weight distribution, a density of 0.941-0.959 grams per cubic centimeter and a weight-average molecular weight that is 110,000 grams per mole or greater, and wherein all cross section dimensions of the cavitated oriented polymer composition article exceed two millimeters.

2. The cavitated oriented polymer composition article of claim 1, wherein ten percent or more of the polyethylene polymer chains have a molecular weight of 316,000 grams per mole or higher.

3. The cavitated oriented polymer composition article of claim 1, wherein the weight-average molecular weight of the polyethylene polymer is 170,000 grams per mole or higher.

4. The cavitated oriented polymer composition article of claim 1, wherein the polyethylene polymer is selected from a group consisting of polyethylene homopolymer and polyethylene copolymers containing polymerized ethylene units and one or more than one unsaturated hydrocarbon having from four to eight carbons copolymerized with the ethylene units.

5. The cavitated oriented polymer composition article of claim 1, wherein the polymer billet comprises more than 20 weight-percent filler based on polymer billet weight.

6. A cavitated oriented polymer composition article formed from a polymer billet comprising a filler and a continuous phase of polyethylene polymer wherein the polyethylene polymer accounts for more than 50% of all polymers in the polymer billet, has at least a unimodal molecular weight distribution, a density of 0.941-0.959 grams per cubic centimeter and a weight-average molecular weight that is 110,000 grams per mole or greater, and wherein all cross section dimensions of the cavitated oriented polymer composition article exceed two millimeters and wherein the extent of cavitation of the cavitated oriented polymer composition article is greater than 30%.

7. The cavitated oriented polymer composition article of claim 6, wherein ten percent or more of the polyethylene polymer chains have a molecular weight of 316,000 grams per mole or higher.

8. The cavitated oriented polymer composition article of claim 6, wherein the weight-average molecular weight of the polyethylene polymer is 170,000 grams per mole or higher.

9. The cavitated oriented polymer composition article of claim 6, wherein the polyethylene polymer is selected from a group consisting of polyethylene homopolymer and polyethylene copolymers containing polymerized ethylene units and one or more than one unsaturated hydrocarbon having from four to eight carbons copolymerized with the ethylene units.

10. The cavitated oriented polymer composition article of claim 6, wherein the polymer billet comprises more than 20 weight-percent filler based on polymer billet weight.

* * * * *